United States Patent [19]
Kotani et al.

[11] 4,376,282
[45] Mar. 8, 1983

[54] OPTICAL PRINT HEAD WITH GRADED INDEX FIBER ARRAYS FOR OPTICAL PRINTING DEVICES

[75] Inventors: Shintaro Kotani; Ichimatsu Abiko, both of Tokyo; Yukio Tokunaga; Kazuyoshi Tateishi, both of Yokosuka, all of Japan

[73] Assignees: Oki Electric Industry Co., Ltd.; Nippon Telegraph and Telephone Public Corporation, both of Tokyo, Japan

[21] Appl. No.: 178,540

[22] Filed: Aug. 15, 1980

[30] Foreign Application Priority Data

Aug. 21, 1979 [JP] Japan .................. 54-105574

[51] Int. Cl.³ .................. G01D 9/42; B41B 13/00
[52] U.S. Cl. .................. 346/107 R; 354/5
[58] Field of Search .................. 346/107 R; 354/5

[56] References Cited
U.S. PATENT DOCUMENTS 3,850,517  11/1979  Stephany et al.
3,952,311  4/1976  Lapeyre .................. 346/107 R X
4,090,206  5/1978  Pfeifer et al. .................. 346/107 R
4,107,687  8/1978  Pfeifer et al. .................. 346/107 R
4,318,597  3/1982  Kotani et al. .................. 354/5

Primary Examiner—George H. Miller, Jr.
Attorney, Agent, or Firm—Berger & Palmer

[57] ABSTRACT

An optical printing device includes a photosensitive means having a photosensitive surface and an optical print head. The optical print head has a plurality of arrays of a plurality of light emitting devices selectively energized and an optical means to form light images from the light emitting devices on the photosensitive surface.

A plurality of the light emitting device arrays are arranged in a plurality of rows, with the light emitting devices aligned in a common direction with the arrays.

The optical means comprises a plurality of graded index optical fiber arrays causing light images from the light emitting devices to be formed in a single line on the photosensitive surface.

7 Claims, 7 Drawing Figures

OPTICAL PRINT HEAD WITH GRADED INDEX FIBER ARRAYS FOR OPTICAL PRINTING DEVICES

BACKGROUND OF THE INVENTION

This invention relates to a print head for optical printing devices.

High speed printing devices used in data processing systems are intended for translating electric input signals into a visual representation readily recognizable in a printed form.

Of such printing devices, this invention is applicable to an optical printing device using light sources and photosensitive means, more particularly to an optical printing device using solid state light emitting devices.

For the light emitting devices, linear arrays of light emitting diodes or semiconductor lasers are employed.

An array of light emitting devices may, for example, consist of gallium arsenide phosphide as a base material having N layers of Ga As P formed by means of an epitaxial growth process, and a large number of P layers in a linear configuration formed by diffusion of Zn. However, the maximum available size of gallium assenide phosphide as the base material is limited approximately to five centimeters in terms of its wafer diameter.

For the purpose of extending the printing width of a printer, a plurality of light emitting device arrays are employed and it is necessary to align light images from said light emitting devices in a single straight image line on the photosensitive surface. Hitherto, for an optical printing device, light emitted from each individual light emitting device in an array is coupled to the photosensitive surface by means of each individual optical fiber cable arranged opposite to the corresponding light emitting device.

Said light emitting device and one end of said opposite optical fiber cable either come into contact with each other or are closely disposed leaving a minor spacing which may not exceed the order of several microns. The other end of the optical fiber cable and the photosensitive surface are similarly disposed leaving a spacing which may amount approximately to one hundred microns.

In this case, said respective spacings are extremely delicate as exemplified and therefore must precisely be maintained since the space intervals in excess of the foregoing values will adversely affect the light transmission properties and the extent of light spots, namely the printing quality. It is, however, extremely difficult to keep precisely said space intervals. Moreover if a fiber cable collides with the photosensitive surface, with the spacing between the fiber cable and the photosensitive surface on the drum failing to be provided correctly, the fiber cable and the photosensitive surface may be damaged due to the rotation movement of the drum.

In the case of a fiber cable, its image plane is located at the tip cross-section thereof, whereby the focal depth can be available only inside the cable.

SUMMARY OF THE INVENTION

An object of the present invention is to provide a novel print head for high speed optical printing devices.

Another object of the present invention is the provision of a print head capable of achieving high quality printout.

A further object of the present invention is to provide an easy adjustment of the positional relations between each other of the constituent units of a print head.

A print head according to this invention includes a plurality of arrays having a plurality of light emitting devices to be energized selectively, and an optical means for forming light images from said light emitting devices on a photosensitive surface.

A plurality of light emitting device arrays are arranged on a plurality of rows with the light emitting devices being aligned in a single row in a common direction with said arrays.

The optical means consists of a plurality of graded index optical fiber arrays and projects images from the light emitting devices in a single straight line on said photosensitive surface.

For a better understanding of this invention, reference is made to the following detailed description of the invention given in connection with the accompanying drawings. In the drawings:

DETAILED DESCRIPTION OF PREFERRED EMBODIMENTS

Figure 1:
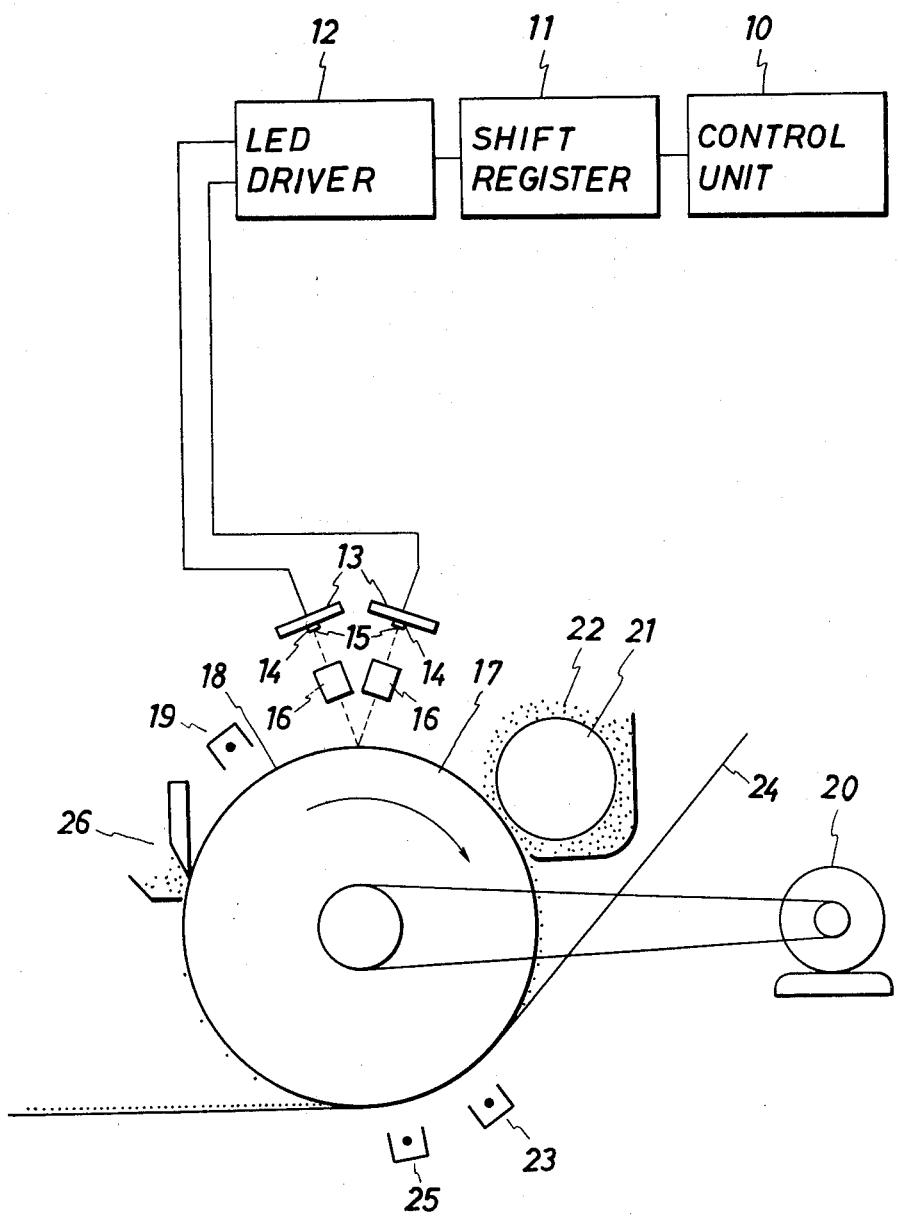
FIG. 1 is a schematic view of an optical printing system according to the invention.

Referring now to FIG. 1, there is shown an optical printing system according to the invention. The system comprises an optical printer which provides a dot pattern representation for characters by means of, for example, a Xerographic system using a photosensitive surface. A plurality of electrical input signals representing character information are sent from an input/output control unit 10 to a shift register 11. The shift register 11 temporarily stores the character information and upon framing the information for a complete printing line, transfers the information for the complete dot line to a driving circuit 12 of light emitting devices.

The light emitting device driver 12 is energized by said information and the light emitting device arrays 14 mounted on ceramic headers 13 become illuminated. The light emitting device arrays 14 are provided with a large number of light emitting devices 15 or light emitting diodes aligned in a linear array. Said light emitting devices 15 are energized selectively by the light emitting device driver 12. Light emitted from the light emitting device arrays 14 is projected as light images in a single image line on a photosensitive surface 18 of a photosensitive drum 17 through the graded index optical fiber arrays 16.

When projection of a chain of dots representing a first full line is completed, then a second line is formed by means of dot information. With this sequence being repeated, printout of the character information for each individual line is accomplished. In this manner, the character information for the succeeding lines are printed out on a line-by-line basis.

The method for printout by implementing light images formed on a photosensitive drum 17 is well known to those skilled in the art.

In brief, a charger 19 places a corona charge on the photosensitive drum 17. If the photosensitive surface 18 is exposed to light emitted from the light emitting device arrays 14, electrostatic latent images are formed in the areas so exposed. With the photosensitive drum 17 being driven at a constant rotation rate by means of a motor 20, a black toner 22 of magnetic material is applied to develop the electrostatic latent images when said areas arrive at the proximity of a developer 21.

Then transfer stage 23 attracts electrostatically the toner material from the photosensitive surface 18 and transfers the toner images onto a sheet of paper 24. Separation stage 25 is provided for separating a printout paper sheet from the photosensitive surface 17. Any residual toner material on the photosensitive surface 18 can be removed by means of a cleaning stage 26.

While in the optical printer disclosed above, a photosensitive drum having a photosensitive surface is employed as a photosensitive means, it may be replaced with a photosensitive copy paper sheet or a photosensitive surface of a design to be fed by means of a belt conveyer.

In short, any means having a photosensitive surface capable of forming light images may be implemented.

Figure 2:
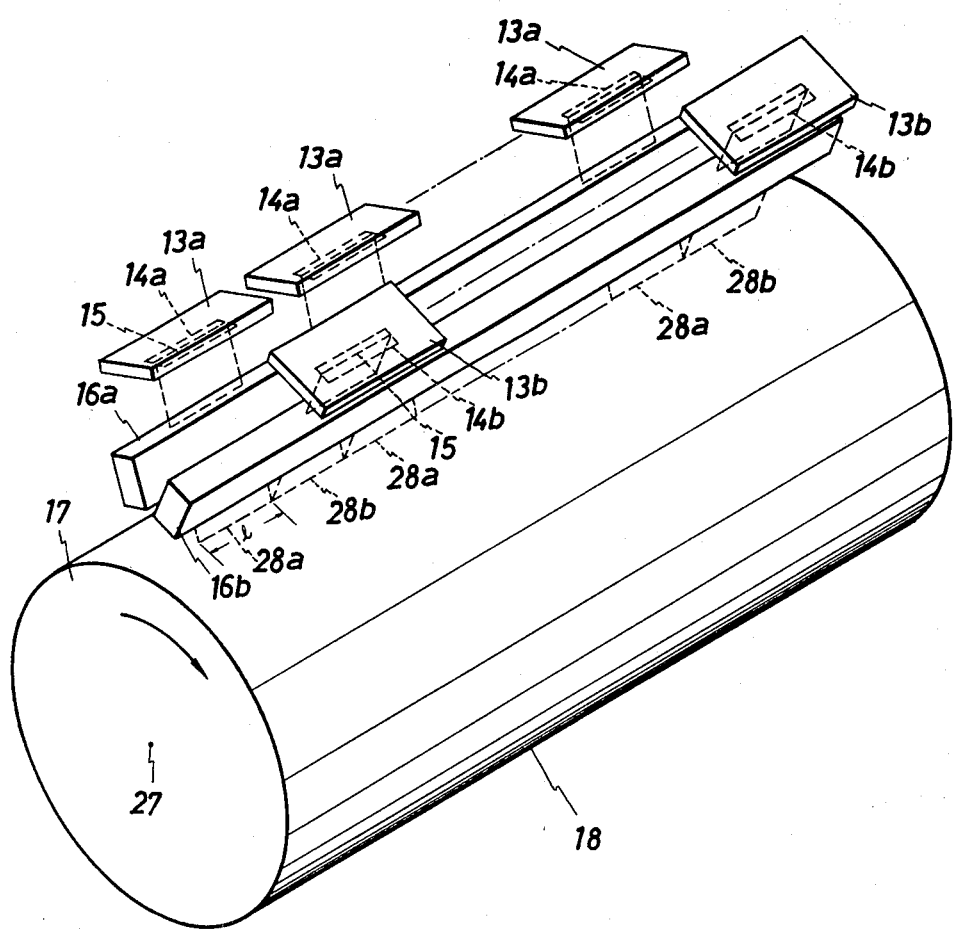
FIG. 2 shows an embodiment of the invention wherein, among others, arrangements of the light emitting device arrays and the graded index optical fiber arrays are illustrated. Light images from the light emitting devices are also illustrated.

FIG. 2 shows an embodiment of this invention. Light emitting device arrays 14a and 14b each comprising a large number of light emitting devices 15 arranged in a single straight line are mounted on ceramic headers 13a and 13b and are disposed in a plurality of rows, for example, in two rows along a longitudinal axis of the photosensitive drum 17. Headers 13a and 13b are positioned with the predetermined space intervals in their respective rows parallel to the photosensitive surface 18. Therefore, the light emitting device arrays 14a and 14b are disposed in a staggered configuration alternately in two intermittent rows in the same direction as the rows of the light emitting devices 15. Light emitting device arrays 14a in row a and the light emitting device arrays 14b in row b are laterally spaced with each other by the predetermined space intervals and the light emitting devices 15 in the light emitting device arrays in each row are arranged in a straight line, while the two rows of the light emitting devices are disposed in parallel with respect to each other.

A graded index optical fiber array 16a is disposed between the light emitting device arrays 14a in row a and the photosensitive surface 18, while an optical fiber array 16b is disposed between the light emitting device arrays 14b in row b and the photosensitive surface 18. The optical axes of the optical fiber arrays 16a and 16b are oriented so as to project their respective images in the same line on the photosensitive surface 18 in relation to the rotation direction of the photosensitive drum 17. Each of the optical fiber arrays 16a and 16b is of an equimultiple lens power. Light emitted from each of the light emitting device array 14a is projected as light images 28a by means of the graded index optical fiber array 16a on the photosensitive surface 18. Light outputs derived from each of the light emitting device arrays 14b are also imaged as light images 28b on the photosensitive surface 18 in the same manner by means of the graded index optical fiber array 16b. The maximum lateral dimension l of the light images 28a and 28b is equal to the lateral length of each individual array of the light emitting devices 15 and said images 28a and 28b are formed at the pitch twice that length in a single straight line extending perpendicularly to the rotation direction of the photosensitive drum 17 or along the longitudinal axis 27. Therefore, the light images 28a and 28b are aligned with each other and are formed alternately in a single straight line on the photosensitive surface 18.

Figure 3:
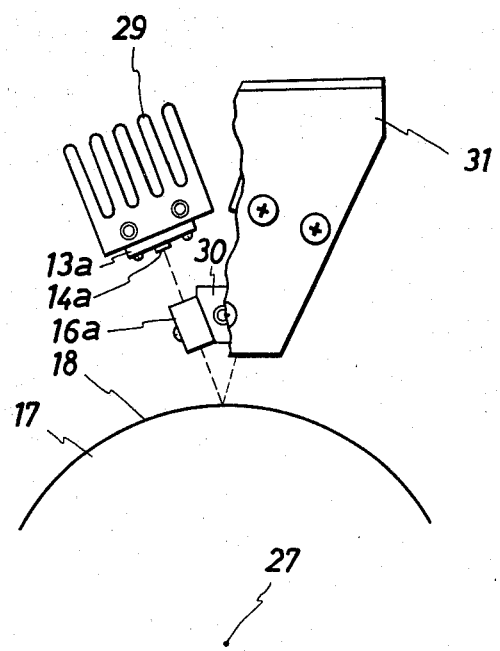
FIG. 3 is a side view of arrangements of the light emitting device arrays and the graded index optical fiber arrays.

FIG. 3 shows the positional relationship with each other of the light emitting device arrays, graded index optical fiber arrays and photosensitive drum. This figure is a view taken from the side in FIG. 2.

Figure 4:
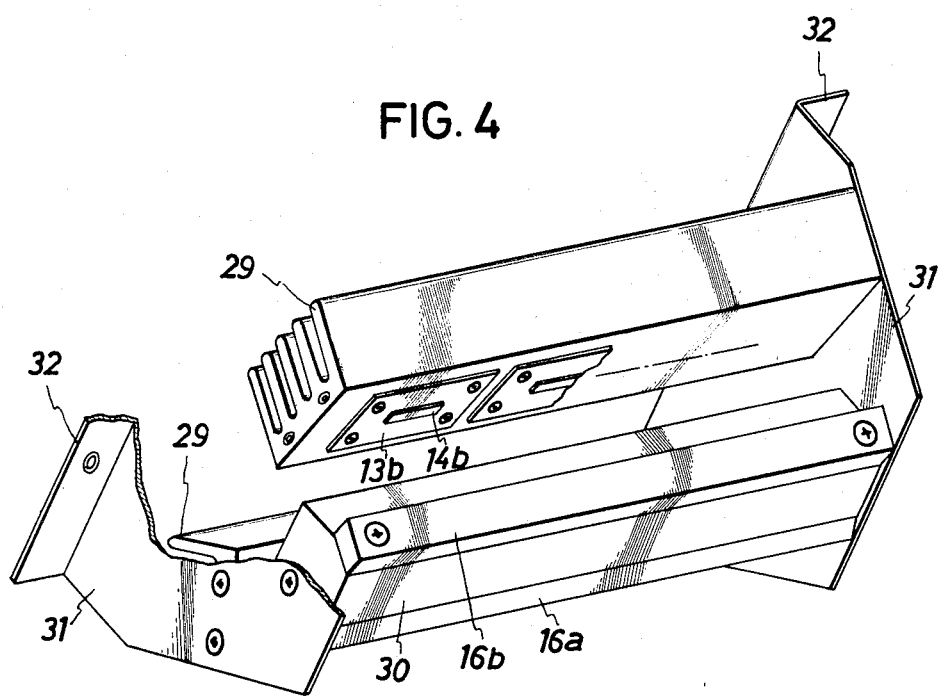
FIG. 4 illustrates a manner to mount the light emitting devices arrays and the graded index optical fiber arrays.

FIG. 4 illustrates a manner of assembling the light emitting device arrays and graded index optical fiber arrays.

Turning now to FIG. 3, the light emitting device array 14a is mounted on the ceramic header 13a which is further mounted on a heat sink 29 by means of screws. More particularly, a ceramic header 13b is mounted on the bottom surface of the heat sink 29 as illustrated as 13b in FIG. 4.

Graded index optical fiber arrays 16a and 16b are secured respectively to each of both sides of a spacer 30 by means of screws. The heat sink 29 and the spacer 30 are secured to holders 31 by means of screws at both of their extremities. Both holders 31 are assembled into the printer main frame by means of screws at their mounting flanges 32.

As shown in FIG. 3, the space between light emitting device array 14a and graded index optical fiber array 16a is the same amount as that between said fiber array 16a and the photosensitive surface 18. Said space may range from a few millimeters up to the order of ten millimeters, thereby making it possible to adjust the positions of each constituent unit with considerable ease since said space is substantially greater than what is required in conventional techniques.

Figure 5:
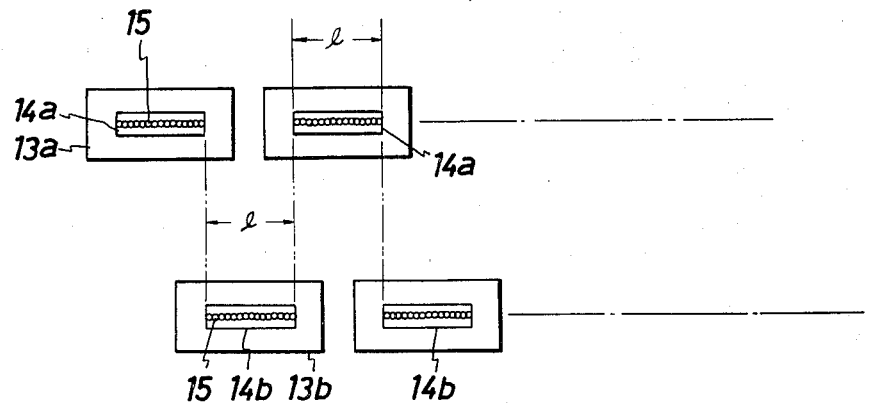
FIG. 5 is an illustration of the light emitting device arrays and an arrangement thereof viewed from the photosensitive surface.

FIG. 5 is a view of light emitting device arrays with each of the light emitting device arrays 14a and 14b being mounted respectively on the ceramic header 13a 13b. Each of the light emitting device arrays 14a and 14b includes a large number of light emitting devices 15 which are disposed in a queue and are energized selectively. By way of example, a light emitting device array contains 128 light emitting devices disposed laterally and interspaced between each other at 0.1 millimeter intervals, if a resolution of 10 lines per millimeter is required. Light emitting device arrays 14a in row a and 14b in row b are disposed alternately in two rows in a staggered configuration. Each of the light emitting devices 15 has a dimension of l in the row direction and the interspacing between each other of the light emitting devices is measured also at l.

Similarly, light arrays of light emitting devices on each row, namely a total of sixteen arrays are necessary to provide an optical print head. In this case, the total number of the light emitting devices amounts to 2048, a multiple of 128 by 16.

Figure 6:
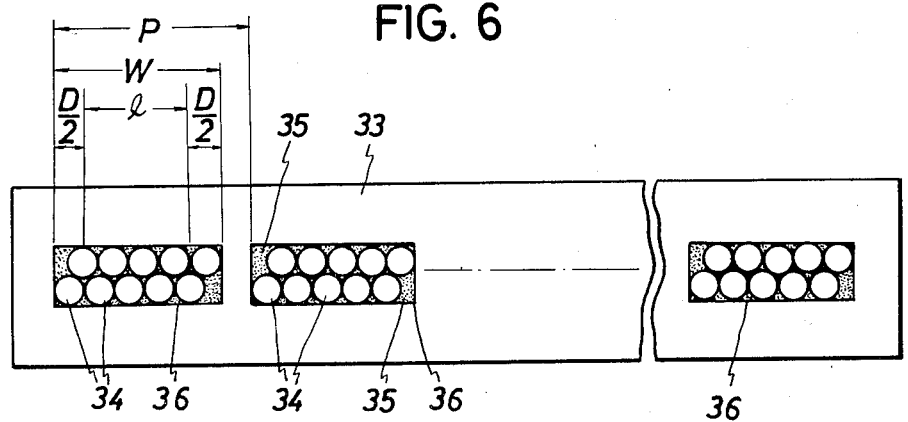
FIG. 6 and FIG. 7 show arrangements of the graded index optical fiber arrays viewed from the optical axes.

FIG. 6 shows a graded index optical fiber array viewed along its optical axis.

The graded index optical fiber array includes a certain number of segments of graded index optical fiber lenses 34 disposed in two rows, which segments are spaced with each other with a predetermined pitch on a support 33, and are embedded thereinto and are packaged by means of resin material 35 filling the interstices of said lenses. A glass-reinforced epoxy resin material may, by way of example, be used as the support 33 and-epoxy resin as said resin material 35.

Graded index optical fiber arrays are made up of a plurality of individual lenses 34 formed by cutting an optical fiber bundle crosswise in a predetermined dimension so as to obtain an image formation function and images of an equimultiple lens power. Said optical fiber lenses 34 have a diameter of approximately 1 millimeter. In the graded index optical fiber arrays, a image formation for one spot is accomplished by means of a certain number of optical fiber lenses 34. The diameter of a bundle of optical fiber lenses contributing to the image formation is assumed to be D.

Graded index optical fiber arrays as illustrated in FIG. 6 include optical fiber lenses grouped on a segment basis so as to render each of said segments 34 to be placed opposite to a corresponding one of the light emitting device arrays. The width of a single optical fiber lens segment 36 is determined to warrant that W=l+D, wherein l, as described before, represents the lateral dimension of each individual light emitting device 15 of the light emitting device arrays 14a and 14b and corresponds to the image length on the photosensitive surface 18 as illustrated in FIG. 2. Optical fiber lens segments 36 are defined in the manner that P=2 l, wherein P represents the pitch and each of the segments are disposed so as to be coupled to a corresponding one of the light emitting device arrays 14a or 14b.

Figure 7:
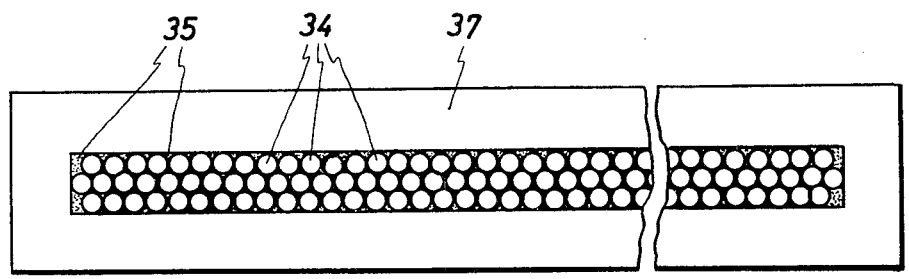

FIG. 7 shows a graded index optical fiber array in which a large number of graded index fiber lenses 34 disposed in three rows are embedded into a support 37 to form a single array and are packaged by means of a resin material 35. Graded index optical fiber lenses 34 are disposed so that they are coupled to the complete elements of a plurality of light emitting device arrays. In this case, they can be more readily assembled because of the absence of a segment construction which entails physical restrictions in size inherent to the graded index optical fiber arrays as illustrated in FIG. 6.

As evidenced in the foregoing description, the present invention provides the following advantages.

According to this invention, light emitting device arrays are used as light sources and graded index optical fiber arrays are employed as part of the optical system, which makes it feasible to provide a small size, high speed, high printing quality optical printer.

According further to this invention, between light emitting device arrays and graded index optical fiber arrays, as well as between said fiber arrays and the photosensitive surface, there can be left respectively appropriate space of several millimeters large enough to assure that the space intervals are readily determined and adjusted therebetween. In addition, the absence of physical contact between the units involved can prevent them from being damaged due to collisions with each other.

In a xerographic reproduction system, a toner material is dispersed at the moment light emitting device arrays are energized but the dispersion extent of its particles is not enough.

As described in the foregoing, this invention makes it practical to leave adequate space intervals between the constituent units. Thus, the light transmission loss due to the adherence of a toner material to graded index optical fiber arrays can be of little importance because of a proper amount of space provided between the related units.

According to the invention, the plane of image formation of a graded index optical fiber array is located in the space including the photosensitive surface. Therefore, the focal depth can be taken on both sides of said image plane.

A graded index optical fiber array applicable in use to the invention is readily available due to its simple construction in which a plurality of optical fiber lenses are laterally disposed and are embedded into a support.

It should be emphasized that the foregoing description of embodiments of this invention is intended as merely illustrative for a better understanding of the invention and not as restrictive thereof. And it goes without saying that the invention may be modified without departing from the scope and spirit of the invention.

What is claimed is:

1. An optical print head for optical printing devices comprising light emitting device arrays having a plurality of light emitting devices selectively energized and arranged in a row, said light emitting device arrays being arranged in a plurality of rows with said light emitting devices aligned in a common direction with said light emitting device arrays, and a plurality of graded index optical fiber arrays focusing the whole of light images from said light emitting devices so as to be formed in a single image line on a photosensitive surface of photosensitive means, each of said graded index optical fiber arrays being arranged opposite to each corresponding row of said light emitting device arrays and each of said graded index fiber arrays having an equimultiple lens power.

2. An optical print head of claim 1 in which said light emitting device arrays are solid state laser arrays.

3. An optical print head of claim 1 in which said light emitting device arrays are arranged alternately in two staggered rows, the light emitting devices in each of said light emitting device arrays in each of said rows being arranged side by side and being spaced uniformly between each other by a distance corresponding to the lateral dimension of each individual element thereof.

4. An optical print head of claim 1 in which said graded index optical fiber arrays comprise a plurality of optical fiber lenses grouped into a plurality of segments arranged on a support, whereby each of said graded index optical fiber arrays is positioned opposite to a corresponding one of said light emitting device arrays.

5. An optical print head of claim 1 in which said graded index optical fiber arrays comprise a plurality of optical fiber lenses arranged on a single continuous support, whereby said graded index optical fiber arrays are positioned opposite to the whole of said plurality of light emitting device arrays.

6. An optical print head of claim 1 in which said light emitting device arrays are light emitting solid state diode arrays.

7. An optical print head of claim 1, wherein the distance between said light emitting devices and said plurality of graded index optical fiber arrays is substantially equal to the distance between said plurality of graded index optical fiber arrays and said photosensitive surface of said photosensitive means.

* * * * *